United States Patent Office 3,419,528
Patented Dec. 31, 1968

3,419,528
PROCESS FOR PREPARING MODIFIED
POLYOXYMETHYLENES
Hans Dieter Hermann, Klemens Gutweiler, and Edgar Fischer, Frankfurt am Main, Germany, assignors to Farbwerke Hoechst Aktiengesellschaft vormals Meister Lucius & Bruning, Frankfurt am Main, Germany, a corporation of Germany
No Drawing. Filed Aug. 6, 1964, Ser. No. 387,991
Claims priority, application Germany, Aug. 9, 1963,
F 40,459
6 Claims. (Cl. 260—67)

ABSTRACT OF THE DISCLOSURE

A process for preparing polyoxymethylene homopolymers and copolymers modified by incorporation of an aromatic compound directly in the polymer chain.

---

The present invention relates to a process for preparing modified polyoxymethylenes.

It is known that polyoxymethylenes containing aromatic substances incorporated in the molecule chain or at the end thereof can be obtained by treating pure finished polyoxymethylenes with aromatic hydrocarbons in the presence of strong acids. Under the manufacturing conditions the polyoxymethylene is, however, partially degraded so that only unsatisfactory yields are obtained.

Now we have found that modified polyoxymethylenes containing aromatic substances directly incorporated in the molecule chain, advantageously at the end of the chain, can be obtained in a high yield without degradation by subjecting trioxan, if desired together with other monomers, in the presence of anthracene, naphthalene, their alkyl-substituted derivatives or derivatives of benzene containing 2 to 5 alkyl groups, in known manner to a cationic polymerization at temperatures within the range of —50° to +100° C. The alkyl groups may contain 1 to 18 carbon atoms. Advantageously methyl-, ethyl-, isopropyl- or tertiary butyl groups may be used. Aromatic substances particularly suitable for use in the process of the invention are, for example, anthracene, 1-alkyl naphthalenes, 2-alkyl naphthalenes, 1,3-dialkyl naphthalenes, 1,4-dialkyl naphthalenes, dialkylbenzenes and trialkylbenzenes such as ortho-, meta- or para-xylene and mesitylene.

The modified polymers are obtained in a high yield by adding cationic catalysts to a mixture of trioxan and the above aromatic substances. As catalysts there may be used, for example, acids such as, for example, sulfuric acid or perchloric acid, acid halides or Lewis acids such as, for example, the halides of boron, aluminum, tin, antimony, titanium, zinc, iron or other metals and their complex compounds.

Boron fluoride and its complex compounds, for example boron fluoride dibutyl etherate, boron fluoride diethyl etherate and boron fluoride methyl ethyl etherate, are particularly suitable for use. It is also advantageous to use diazonium fluoroborates, such as, for example, para-nitrophenyl diazonium fluoroborate. The concentration of the catalyst may vary within wide limits. It depends chiefly on the nature of the catalyst and may be within the range of 0.0001 and 1% by weight calculated on the monomer mixture. In general, 0.001 to 0.1% by weight of catalyst is used.

The polymerization may be carried out according to known methods, that is in bulk, in solution or in suspension. As solvent there may advantageously be used hydrocarbons, halogenated hydrocarbons or ethers. The polymerization in bulk takes a particularly smooth course.

The polymerization is advantageously carried out at temperatures at which trioxan does not crystallize out, that is depending on the solvent used at a temperature within the range of —50 to +100° C. and in the absence of a solvent at a temperature within the range of +20 to +100° C. If it is desired to obtain polymers of particularly high molecular weight, the polymerization is advantageously carried out at 30 to 60° C., the trioxan being in a solid state.

The concentration of the aromatic hydrocarbons in the monomer mixture may vary within wide limits. For example, highly active aromatic substances, for example anthracene, are already incorporated at a concentration of 0.0001% by weight while trioxan may still polymerize in a relatively large excess of, for example, m-xylene. Advantageously a concentration of 0.001 to 10% by weight calculated on the monomer mixture are used.

The aromatic substances to be used in the process of the invention tend to reduce the molecular weight of the polymers to a greater or lesser degree. It is therefore also possible to obtain modified polyoxymethylenes of relatively low molecular weight. Also, the choice of an appropriate concentration of aromatic substance enables a determined desired molecular weight, which may be within the range of about 300 to 300,000, to be easily obtained. The molecular weight-reducing effect depends on the nature of the aromatic substance used in a given case. Anthracene, for example, is more effective than m-xylene.

The incorporation of the aromatic substances in the modified polyoxymethylenes can be proved with the help of the infra-red spectrum or by microdetermination of the carbon content.

In addition to trioxan and the above aromatic substances, up to 20% by weight of other monomers copolymerizable with trioxan may be used for the polymerization, the percentage figure being calculated on the trioxan. There may be used, for example, cyclic ethers of the formula

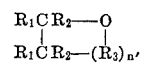

in which $R_1$ and $R_2$ each represent a hydrogen atom or a lower alkyl radical which may be substituted by halogen, $R_3$ stands for a methylene radical, oxymethylene radical, lower alkyl-substituted or haloalkyl-substituted methylene radical or lower alkyl-substituted or haloalkyl-substituted oxymethylene radical, and $n'$ is zero or a number within the range of 1 to 3. Particularly suitable are epoxides such as, for example, ethylene oxide, propylene oxide or styrene oxide, derivatives of oxacyclobutane or cyclic acetals such as, for example, ethylene glycol formal or diethylene glycol formal, or vinyl compounds such as, for example, styrene or acrylonitrile.

Since the polymers so obtained are little resistant to acids, the catalyst is advantageously neutralized in known manner, for example, with ammonia or amines immediately after the polymerization.

The polymers may subsequently be stabilized according to a process commonly used for stabilizing polyoxymethylenes or trioxan copolymers, for example, by etherification or esterification of the semiacetal groups which may still be present or by subjecting the polymer to an alkaline after-treatment at elevated temperatures. The polymers may also be stabilized in known manner against the action of heat, light and oxygen. Examples of suitable heat stabilizers are polyamides, amides of poly-basic carboxylic acids, amidines and urea compounds. As oxidation stabilizers phenols, advantageously bisphenols, and aromatic amines may be used. Suitable light stabilizers are alpha-oxybenzophenones.

The modified polyoxymethylenes obtained by the process of the invention may be used for many applications. Low molecular weight polymers may be used as adhesives or lacquers or varnishes. High molecular weight polymers constitute rigid plastic materials which can be made into shaped bodies by conventional injection moulding, extrusion or compression moulding processes.

The following examples serve to illustrate the invention but they are not intended to limit it thereto, the parts being by weight.

Example 1

To 90 parts pure trioxan and 10 parts pure m-xylene, 0.007 part boron fluoride (in the form of boron fluoride dibutyl etherate in 0.5 part cyclohexane) was added at 70° C. with the exclusion of air, while shaking. Polymerization set in after a few seconds and was terminated after 5 minutes. To remove monomers that had not undergone reaction and neutralize the polymerization catalyst, the ground polymer was boiled twice with 5 times the amount of methanol containing 1% of ethanolamine. After filtration, the polymer was washed with methanol and dried. The yield amounted to 55%. A sample of the polymer was dissolved in hot diethylene glycol monoethyl ether and reprecipitated by cooling. The sample was then suction-filtered and boiled several times with methanol. The polymer so obtained showed strong bands belonging to aromatic substance in the infra-red spectrum. Similar results were obtained when o-xylene, p-xylene, 1-methyl naphthalene or 1,5-di-tert. butyl naphthalene was used instead of m-xylene.

Example 2

Several mixtures of trioxan and m-xylene were prepared. Of each mixture 100 parts were admixed at 70° C. with 0.01 part gaseous boron fluoride (diluted with nitrogen in a ratio of 1:10). The polymer was treated with methanol and dried as described in Example 1. Of the individual samples the reduced viscosity was determined (measured on a 0.5% solution of polymer in butyrolactone containing 2% of diphenylamine, at 140° C.). The following table shows the molecular weight-reducing action of the m-xylene:

| Percent by weight of m-xylene in the mixture | Yield, percent | Reduced viscosity |
|---|---|---|
| 0 | 99 | 0.65 |
| 0.1 | 99 | 0.52 |
| 0.5 | 99 | 0.37 |
| 1 | 98 | 0.24 |
| 2.5 | 97 | 0.15 |

Example 3

93 parts trioxan, 2 parts ethylene oxide and 5 parts pure anthracene were mixed with one another and polymerized at 65° C. with 0.02 part p-nitrophenyldiazonium fluoroborate. The polymer was then dissolved in 10 times the amount of diethylene glycol monoethyl ether containing 2% of triethanolamine and the whole was kept for 30 minutes at 150° C. After cooling, the polymer which had precipitated was suction-filtered, washed and dried. A yellow, thermally stable polymer of low molecular weight containing 5% by weight of incorporated anthracene was obtained in a yield of 60%.

Example 4

100 parts of a comminuted mixture of 98% of trioxan and 2% of mesitylene were charged at 20° C. with 0.01 part gaseous boron fluoride. When the mixture was heated to 50° C. polymerization occurred. The product was processed as described in Example 1. The infra-red spectrum showed that mesitylene had been incorporated in the polymer.

We claim:
1. A process for preparing an oxymethylene polymer having an aromatic hydrocarbon incorporated in the polymer chain which comprises subjecting to cationic polymerization at a temperature within the range of −50° to +100° C., trioxane or a mixture of trioxane with up to 20% by weight, calculated on the trioxane, of a co-monomer copolymerizable with trioxane and having the formula

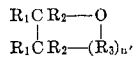

in which $R_1$ and $R_2$ are hydrogen, lower alkyl or lower halogenated alkyl, $R_3$ stands for methylene, oxymethylene, lower alkyl-substituted oxymethylene or lower haloalkyl-substituted oxymethylene and $n'$ is an integer from 0 to 3, with 0.001 to 10% by weight calculated on the weight of monomer, of an aromatic hydrocarbon of the group consisting of anthracene; naphthalene; 1-alkyl naphthalene, 2-alkyl naphthalene, 1,3-dialkyl naphthalene, and 1,4-dialkyl naphthalene, wherein the alkyl radical is from 1 to 18 carbon atoms; benzene and benzene derivatives containing two to five alkyl groups.

2. A process as defined in claim 1 wherein the aromatic hydrocarbon is anthracene.

3. A process as defined in claim 1 wherein the aromatic hydrocarbon is naphthalene.

4. A process as defined in claim 1 wherein the aromatic hydrocarbon is an alkyl-substituted benzene.

5. An oxymethylene polymer prepared by the process defined in claim 1.

6. A process as defined in claim 1 wherein the aromatic hydrocarbon is 1-alkyl napthalene, the alkyl group consisting of from 1 to 18 carbon atoms.

References Cited

UNITED STATES PATENTS

| 2,417,548 | 3/1947 | Engel. |
| 3,238,182 | 3/1966 | Goodrich. |
| 3,275,603 | 9/1966 | Yakimik. |
| 3,317,477 | 5/1967 | Wilson et al. _____ 260—73 |

FOREIGN PATENTS

| 1,017,866 | 1/1966 | Great Britain. |

WILLIAM H. SHORT, *Primary Examiner.*

L. M. PHYNES, *Assistant Examiner.*

U.S. Cl. X.R.

260—73